United States Patent
Lewis

(10) Patent No.: US 6,297,772 B1
(45) Date of Patent: Oct. 2, 2001

(54) PREDICTING COHERENT SIDELOBE CANCELLER

(75) Inventor: Bernard L. Lewis, Oxon Hill, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 05/508,363

(22) Filed: Sep. 23, 1974

(51) Int. Cl.[7] ................................. G01S 3/16; G01S 3/28
(52) U.S. Cl. .......................... 342/381; 342/384; 342/17; 342/159; 342/162
(58) Field of Search ............. 343/100 LE; 325/473–476; 342/13, 16, 17, 18, 19, 39, 379, 380, 381, 384, 159, 162

(56) References Cited

U.S. PATENT DOCUMENTS

| | | | |
|---|---|---|---|
| 3,763,490 | * 10/1973 | Hadley et al. | 342/375 |
| 3,881,177 | * 4/1975 | Len et al. | 342/16 |
| 3,938,153 | * 2/1976 | Lewis et al. | 342/381 |
| 3,938,154 | * 2/1976 | Lewis | 342/381 |
| 3,981,014 | * 9/1976 | Masak | 342/380 |
| 3,982,245 | * 9/1976 | Soule, Jr. et al. | 342/379 |
| 3,987,444 | * 10/1976 | Masak et al. | 342/380 |
| 4,044,359 | * 8/1977 | Applebaum et al. | 342/379 |
| 4,070,675 | * 1/1978 | Daniel et al. | 342/380 |
| 4,204,211 | * 5/1980 | Cavelos | 342/380 |
| 4,586,048 | * 4/1986 | Downie | 342/379 |
| 4,689,628 | * 8/1987 | Lewis | 342/384 |
| 5,296,865 | * 3/1994 | Lewis | 342/384 |

* cited by examiner

Primary Examiner—John B. Sotomayor
(74) Attorney, Agent, or Firm—Thomas E. McDonnell; Charles J. Stockstill

(57) ABSTRACT

A system for instrumenting time sampled predicting interference suppression, particularly in a side-lobe canceller system. Main and auxiliary channel signals are supplied to a canceller loop where correlating weights are sampled just prior to a radar pulse transmission on command of a radar pretrigger pulse. A sampling circuit stores both current and past weights and combines the current weight with the integral of the difference between the current and past weight to form predicting weights over each pulse repetition period. The predicting weights are used to form a translating signal for operating on the auxiliary channel interference signal so that it will cancel the interference in the main channel. By sampling just prior to radar pulse transmission and forming the predicting weights, cross modulation of clutter and antenna scan error can be reduced in order that a side-lobe canceller may be used compatibly with Moving Target Indicators.

11 Claims, 2 Drawing Sheets

PREDICTING COHERENT SIDELOBE CANCELLER

BACKGROUND OF THE INVENTION

The present invention relates to interference suppression systems and more particularly to side-lobe canceller systems which are compatible with MTI.

Generally, interference suppressing systems of the prior art are designed to reduce the presence of undesired signals in a signal receiving system. As is known, in particular systems, such as a radar system, the characteristics of the receiving antennas are such that undesired signals which are received in the side-lobe interfere with the isolation of the target signal received in the main lobe. Accordingly, to isolate the main lobe signals, side-lobe cancellers have been used to cancel the side-lobe interference of the main radar antenna as exampled by U.S. Pat. No. 3,202,990 to Paul W. Howells.

It has been found that while conventional side-lobe canceller systems are highly successful in most instances, problems arise when the system is used to cancel interference in a high clutter environment where normally Moving Target Indicators (MTI) can be used to cancel the clutter. An MTI relies on the clutter return being the same on a pulse to basis in order to allow distinction from a target return which varies due to target movement between radar pulses. When clutter is present simultaneously with jamming interference, however, it has been found that conventional side-lobe cancellers modify the clutter returns on pulse to pulse basis because of cross modulation between clutter and interference signals. As the clutter returns are not the same, an MTI cannot be used thereby preventing clutter cancellation and prohibiting the use of a side-lobe canceller with the MTI.

One proposal for avoiding clutter modification in a side-lobe canceller involves the sampling of the interference signal in the correlator loop for a short time immediately preceeding radar pulse transmissions, where clutter is weak or non-existent, and using the derived weighting signal to cancel throughout the next pulse repetition period. Such a technique, while reducing clutter modification, also introduces time dependent unbalance in the cancelling signals due to antenna scan between samples.

In U.S. Application Ser. No. 05/499,962 entitled "MTI COMPATIBLE COHERENT SIDELOBE CANCELLER" to Bernard L. Lewis, filed in the United States on Aug. 23, 1974 now U.S. Pat. No. 5,296,865 and assigned to the same assignee as the present application, a side-lobe canceller system is disclosed which delays both main and auxiliary channel signals until cancelling weights at the beginning and end of a pulse repetition period can be derived. Interpolation between the two weights as a function of time is then performed over the pulse repetition period to provide an instantaneous weighting function for translating the delayed auxiliary channel interference signal for subtraction from the main channel interference signal. While such a system provides improved cancellation, the technique suffers from the disadvantage of requiring long delays of wide-band signals to be accurately matched in two separate channels.

Accordingly, the present invention has been developed to overcome the specific shortcomings of the above known and similar techniques and to provide an improved predicting coherent side-lobe canceller system for producing reliable interference cancellation in a high clutter environment.

SUMMARY OF THE INVENTION

It is therefore an object of the present invention to provide an interference suppression system that is simple to implement yet highly reliable in operation.

Another object of the invention is to provide a predicting side-lobe canceller that does not require long delays of wide-band signals.

A further object of the invention is to provide an improved sampling side-lobe canceller that reduces clutter modification and operates compatibly with an MTI in high clutter environments.

Still another object of the invention is to provide a coherent side-lobe cancelling system which uses predicting weights to prevent time dependent unbalance in cancelling signals due to main antenna scan during each pulse repetition period.

A still further object of the invention is to provide intermediate side-lobe cancellers which use past weighting signals to more closely approximate instantaneous weights needed for cancellation over any pulse repetition period.

In order to accomplish the above and other objects, the invention provides a unique predicting side-lobe canceller which reduces clutter modification and antenna scan error. Main and auxiliary channel signals are coupled to a canceller loop having phase and amplitude correlating circuits. The phase and amplitude correlating weights are coupled through a sampling circuit where the correlating weights are sampled during a time period immediately preceeding a radar pulse transmission where clutter returns are substantially absent. The current weights are stored along with past weights and combined in the sampling circuits to provide, as the correlating weights, the sum of the current weight and a time integrated difference of the past and current weight, for use over the current radar pulse repetition period. The sum is called a predicting weight and both amplitude and phase predicting weights are combined to translate the auxiliary interference signal to produce a cancelling signal for subtraction from the main channel signal to more effectively reduce interference in the main channel. Since the samples of the correlating weights are made during a time period substantially devoid of clutter, the cancelling signals are produced without the introduction of cross modulation of clutter. In addition, since the correlating weights are modified instantaneously over the pulse repetition period to predict changes in the cancelling signal based on past weighting samples, the error in cancelling signals normally introduced by antenna scan during a pulse repetition period, is substantially reduced. The overall effect is to produce a main channel signal with side-lobe interference substantially eliminated and a clutter signal that is unmodified by the operation of the side-lobe canceller, thereby allowing use with an MTI.

Other objects, advantages, and novel features of the invention will become apparent from the following detailed description of the invention when considered with the accompanying drawings wherein:

DETAILED DESCRIPTION OF THE PREFERRED EMBODIMENT

Figure 1:
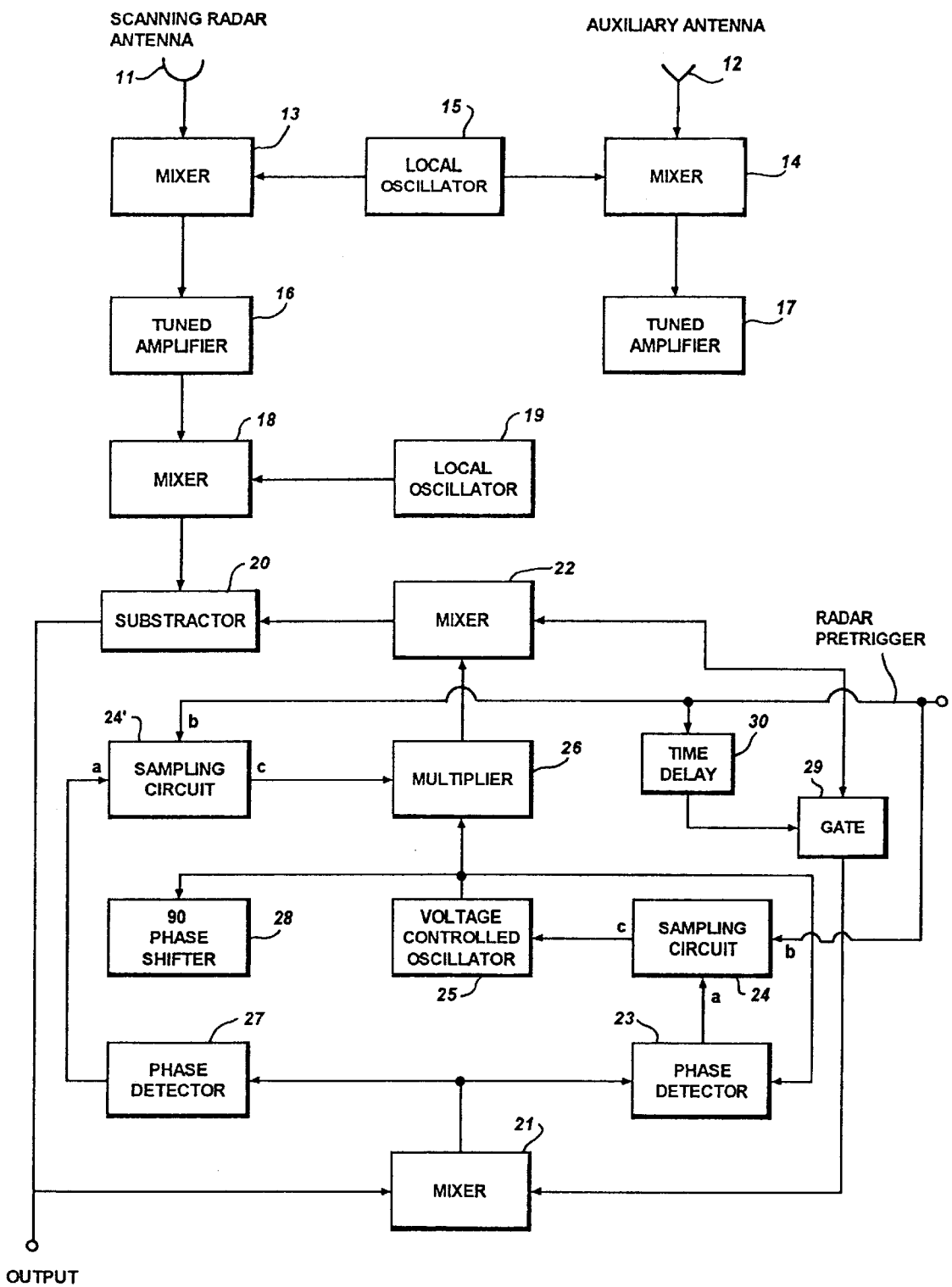
FIG. 1 is a schematic diagram showing a preferred embodiment of the canceller system according to the present invention.

Referring now to FIG. 1, a schematic diagram represents a preferred embodiment of a side-lobe canceller according to the present invention. In the present example, an intermediate frequency (IF) side-lobe canceller in a scanning radar system will be described although the inventive teachings are equally applicable to other types of canceller systems. Generally, the system includes a main receiving channel in the form of a directional radar antenna 11 and an auxiliary receiving channel in the form of an omnidirectional antenna 12. While the system being described only refers to the main antenna as a receiving antenna, the antenna could just as well be modified in a conventional manner to both transmit and receive. The main radar antenna 11 forms the main channel for receiving the desired radar signals in the main lobe and any interference that may be present in the side-lobes. The auxiliary antenna 12 receives primarily undesired interference as samples of the environment in which the radar is attempting to operate. Signals from antenna 11 are mixed with the output of local oscillator 15 down to an intermediate frequency in mixer 13 of conventional construction. In the same manner, signals from auxiliary antenna 12 are mixed with the output of local oscillator 15 down to the same intermediate frequency output as in mixer 13 in a similar mixer 14. The outputs of 13 and 14 are coupled to conventional tuned amplifiers 16 and 17 respectively, which are constructed to have equal response characteristics and a band pass centered at the IF frequency output of 13 and 14. The output of tuned amplifier 16 is coupled to mixer 18 where it is combined with the output of local oscillator 19 to translate the IF frequency output from 16 to offset the IF frequency by an amount greater than the IF bandwidth of the tuned amplifiers 16 and 17. In turn, the output from 18 constitutes the main channel signal and is coupled to a canceller loop along with the output from 17 which constitutes the auxiliary channel signal.

The canceller loop is generally composed of elements 20–28 and operates in a manner similar to conventional loops to measure the correlation between the auxiliary and main channel interference signals such that the auxiliary interference signal may be adjusted in phase and amplitude to subtract from the main channel signal and reduce interference in the radar output. Basically, the canceller loop comprises a subtractor 20 coupled to receive the main channel signal from mixer 18 and provide an output coupled as one input to mixer 21. In a similar manner, the output from amplifier 17 is coupled through gate 29 to a second input of mixer 21. Gate 29 can be a conventional solid state switch, for example, which transmits the signal from 17 to mixer 21 during the time that a radar pretrigger pulse is received through time delay 30, and block transmission of the signal from 17 at all other times. The output from subtractor 20 beats with the output from amplifier 17, during the time that a radar pretrigger pulse is present, to produce a resultant output signal at 21 that has the same frequency as local oscillator 19 and the amplitude of the signal out of subtractor 20. At this point the output from mixer 21 is divided into two branches to control the phase and amplitude of the signal input to mixer 22. In one branch, designated as the phase correlating branch, the output from mixer 21 is coupled as one input to a conventional phase detector 23 where it is compared with the output from voltage controlled oscillator 25 coupled as a second input to detector 23. The output from 23 provides a phase correlating weight, coupled at input a through sampling circuit 24 to oscillator 25, which phase locks the output of oscillator 25 to the output of mixer 21 during the sampling time established by sampling circuit 24 after reception of a radar pretrigger pulse at b. Sampling circuit 24 acts to form a predicting weight during the current pulse repetition period and will be more fully explained with reference to FIG. 2.

In the second branch, designated as the amplitude correlating branch, the output of mixer 21 is coupled as one input to a second conventional phase detector 27 where it is compared with the output: from oscillator 25 coupled as a second input to 27 through a conventional 90° phase shifter 28. The output from 27 provides an amplitude correlating weight at c during the sampling time established by circuit 24', which weight represents a measure of the amplitude out of mixer 21. Circuit 24' is identical in construction to circuit 24 and provides the amplitude correlating weight after reception of the radar pretrigger pulse at b. Output c of sampling circuit 24' is coupled to multiplier 26 along with the output of oscillator 25 and acts to control the gain to the output of oscillator 25. The output of 26 is in turn coupled to mixer 22 along with the auxiliary signal from amplifier 17 where the output from 26 translates the frequency of the auxiliary signal from 17 to the same frequency range as that signal from mixer 18. At the same time, the signal from 26 causes the amplitude of the output of mixer 22 to be proportional to the amplitude of the output of 26. The signal output of mixer 22 constitutes a cancelling signal which is adjusted in phase and amplitude and coupled to a second input to subtractor 20 where it is subtracted from the main channel signal to cancel interference in the radar signal.

Figure 2:
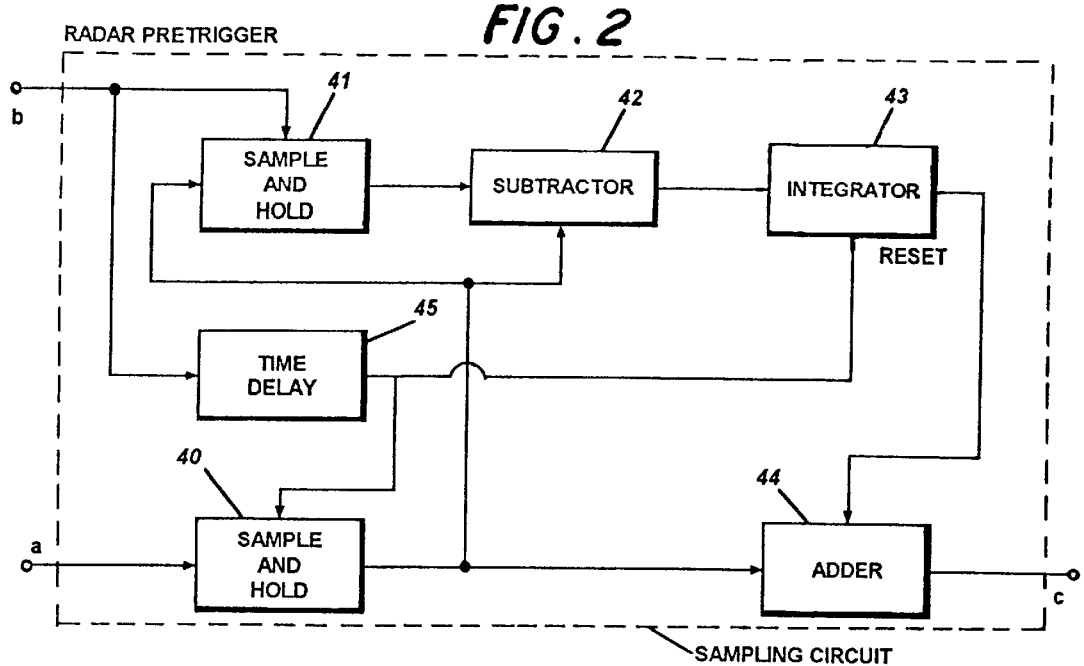
FIG. 2 is a schematic diagram showing the construction of the sampling circuits of FIG. 1 for developing the predicting weights.

Turning now to FIG. 2, the elements forming the sampling circuits 24 and 24' are schematically shown. Generally, each circuit (24 and 24') is comprised of conventional elements 40–45 and is labeled to correspond to the connections a, b, and c as labeled in FIG. 1. The phase detector outputs are coupled at a to the input of sample and hold 40 while the radar pretrigger pulse is delivered at input b. The output from sample and hold 40 is coupled as the input to sample and hold 41. Circuits 40 and 41 are conventional sample and hold circuits which sample the signal at their input during the time that a radar pretrigger pulse is present and hold that signal at their output after the pretrigger pulse ends, until the next pretrigger pulse is received. Accordingly, the pretrigger pulse is delivered at b to sample and hold 41 and also passed at b through time delay 45 to sample and hold 40. The output of sample and hold 40 is then coupled to subtractor 42 along with the output from sample and hold 41 to provide a difference output at 42. This difference output is coupled to an integrator 43 which in turn provides an integrated output that is summed in adder 44 with the output from sample and hold 40. Integrator 43 is a conventional integrator circuit having a reset pulse supplied from delay 45 which resets the integrator output to zero upon reception of a pretrigger pulse from 45, and maintains the output at zero until the pretrigger pulse ends. The output from adder 44 forms the predicting weights, according to the present invention, which drives the correlator loop to produce cancelling signals.

The operation of the system will now be described with reference to FIGS. 1 and 2 and, as can be seen, is similar in many respects to conventional side-lobe canceller operation. When an interference source is present in the vicinity of a radar, main channel will receive signals (radar returns) represented by a radar signal carrier modulated by the radar signal and an interference (jammer) carrier having the same frequency, but different amplitude and phase, modulated by the jammer waveform. At the same time, auxiliary antenna 12 will receive primarily interference signals corresponding to those received by the main radar antenna except for a gain difference and phase shift introduced by the difference in path length from the jammer to the auxiliary antenna and from the jammer to the radar antenna. As is known, if the radar is operating in a high clutter environment, the signal received by the radar antenna will also include clutter returns which are generally distinguishable from moving target returns due to their constant character from one radar pulse to the next. The main channel signal after passing through elements 13 and 16 is combined in a canceller loop as previously described in a manner designed to cancel the interference in the main radar output from subtractor 20. The canceller loop uses the main channel signal in mixer 21 to correlate the interference in each channel and produce phase and amplitude weighting functions to translate the auxiliary interference signal in mixer 22. In the present invention, when the correlator loop is closed, which occurs when the pretrigger pulse causes the sample and hold 40 of circuits 24 and 24' to sample, the output from mixer 22 is subtracted from the output of 18 in subtractor 20 and the difference signal drives the mixer 22 to further suppress the interference out of subtractor 18. In essence, the feedback loop adjusts the phase and amplitude of the interference signal out of mixer 22 to cancel interference in the main channel signal to subtractor 20 in the same manner as conventional canceller systems. As is known, the speed of response of the canceller loop will be proportional to loop gain which, in turn, will be proportional to average power input. The loop will, therefore, tend to cancel signals such as jamming signals having high average power, while being relatively insensitive to signals such as radar returns.

As has been previously noted, conventional side-lobe canceller loops tend to cross modulate clutter and interference signals resulting in a modification of clutter returns on a pulse to pulse basis. This prevents the use of an MTI which requires the clutter returns to be the same from one radar pulse to the next. Accordingly, the present invention utilizes a unique sampling circuit to provide the correct amplitude and phase correlating weights over each pulse repetition period which compensate for antenna scan error and are substantially devoid of clutter. In operation, a radar pretrigger pulse is delivered to both sampling circuits 24 and 24' at inputs b and additionally through time delay 30 (having the same time delay as 45) to gate 29. The radar pretrigger pulse may occur, for example, on the order of 100 microseconds prior to each radar pulse transmission in a radar system having radar pulses occurring every 3 milliseconds and a scanning rate of 1 radian per second. At this time in the pulse repetition period, the clutter returns are weak or nonexistent. The pretrigger pulse may have a duration on the order of about 40 microseconds and is delivered at inputs b to sample and hold 41. While the pretrigger pulse is present, circuit 41 samples the output of sample and hold 40 which represents the past correlating weight of the previous pulse repetition period. Upon completion of the pretrigger pulse, circuit 41 holds that output until the next pretrigger pulse is received. The pretrigger pulse at b also passes through time delay 45 which delays the pulse on the order of 50 microseconds before delivering the delayed pretrigger pulse to sample and hold 40 and the reset of integrator 43. The delayed pretrigger pulse from 45 is coincident in time with the delayed pretrigger pulse from 30 which causes gate 29 to transmit the signal from 17. This delayed pulse from 45 causes circuit 40 to sample and closes the correlating loop through sampling circuits 24 and 24' to develop the current correlating weights at outputs c. At the same time, the delayed pretrigger pulse resets the output of integrator 43 to zero and holds it at zero while the pulse is present. When the delayed pretrigger pulse disappears from 45 and 30, sample and hold 40 retains the current correlating weight present at that time and the gate 29 closes to block signal passage. In addition, the integrator 43 starts to integrate the signal at its input with respect to time, which signal is the difference between the past and current correlating weight as determined by the subtraction of the outputs of 40 and 41 in subtractor 42. This integrated difference provides an indication of weight changes over a previous pulse repetition period and is summed in adder 44 with the current correlating weight from 40 to form the instantaneous predicting weight at c over the current pulse repetition period. As can be seen, since the integrated difference changes with time, the output of c will be a correlating weight changing with time which is predicting the change based on past changes due to antenna scan.

From the above description it is evident that the present invention does indeed provide a more effective system for providing a side-lobe canceller that is compatible with MTI. Using a unique sampling circuit designed to sample the correlating weight at the beginning of each radar pulse repetition period and store the past correlating weight, predicting correlating weights can be formed which are substantially devoid of clutter signals. When the time integral of the difference between the past and current weight is added to the current weight over the current pulse repetition period, an approximate instantaneous predicting weight operates to form a cancelling signal which is substantially devoid of clutter modification and compensates for changes due to antenna scan over the pulse repetition period. The system is simple to implement yet enables improved cancellation and, alternatively, higher order prediction if desired.

Figure 3:
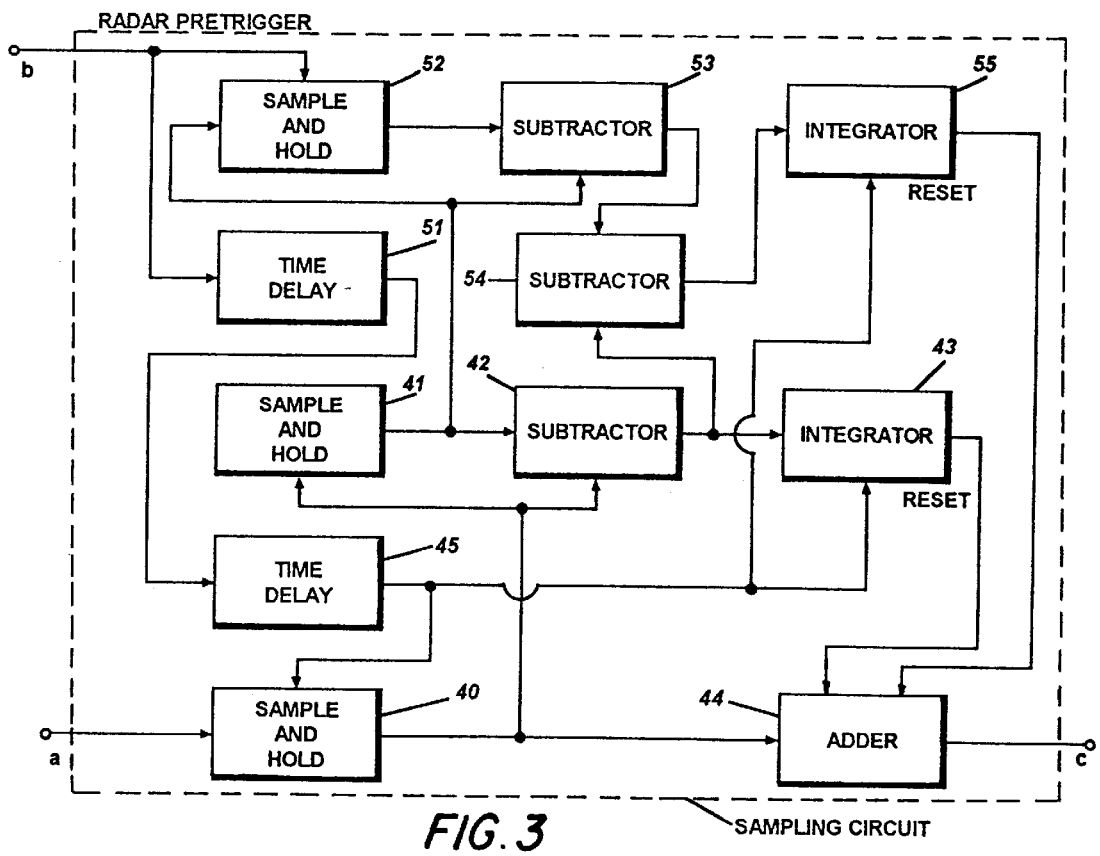
FIG. 3 is a schematic diagram of an alternative embodiment of the sampling circuits of FIG. 1 for compensating for antenna pattern curvature.

For example, FIG. 3 illustrates an alternative embodiment of the sampling circuit that could be used to provide second order prediction that would compensate for curvature in antenna pattern response between samples. The circuit of FIG. 3 uses the same elements 40–45 to operate in the same manner as described with reference to FIG. 2. However, an additional sample and hold circuit 52 is added to receive the radar pretrigger pulse at b while the radar pretrigger pulse to 41 is supplied through delay 51 having the same time delay as 45. Sample and hold 52 operates in the same manner as circuits 40 and 41 except that it is coupled to sample and hold the output of circuit 41 which represents the weight prior to the past weight at the beginning of each pulse repetition period. This weight is subtracted from the past weight of 41 in subtractor 53 and this difference subtracted in subtractor 54 from the difference between the current and past weight at the output of 42. The output difference from 54 is then time integrated in 55 and summed in adder 44 with the time integral from 43 and the current correlating weight from 40, to form the instantaneous predicting weight at c. In order for the proper sampling to occur when utilizing this embodiment, it is required that the time delay 30 be made to have a time delay equal to the total time delay of delays 45 and 51, and that the radar pretrigger pulse be initiated roughly 150 microseconds prior to each radar pulse, when using a system having the parameters previously referred to, so that all sampling is completed immediately prior to radar pulse transmission. It is additionally required that the reset of 55 be taken from the output of delay 45 to reset integrator 55 in the same manner as integrator 43.

In accordance with the circuit of FIG. 3, the instantaneous predicting weights will be formed using approximations based on the changes in two past pulse repetition periods and will provide a more accurate approximation of the cancelling signal to compensate for antenna pattern curvature over each current pulse repetition period.

While the present invention has been described with particular reference to a radar system, it is to be understood that the teachings are equally applicable to other signal processing systems. In addition, while a separate time delay 30 has been shown to deliver the pretrigger pulse to gate 29, the same control could be exercised by using the output of time delay 45 to provide the pretrigger pulse to gate 29. It is to be further noted that conventional filters to restrict mixer output to either the sum or difference frequency as the situation may require, while not shown, are assumed to be included as part of the mixer output in order to obtain proper frequency offset as in conventional side-lobe cancellers.

Obviously many other modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An interference suppression system for use in high clutter environments comprising:
   main channel means for receiving desired and interference signals and providing a main channel signal;
   auxiliary channel means for receiving primarily interference signals and providing an auxiliary channel signal;
   first means coupled to said main and auxiliary channel means for correlating the interference signals to produce phase and amplitude correlating weights;
   second means coupled to said first means for repetitively sampling each of said weights and combining said samples to form instantaneous phase and amplitude predicting weights;
   third means coupled to said second means and said auxiliary channel means for combining said predicting weights and translating said auxiliary channel signal with said combined weights to provide a cancelling signal; and
   means coupled to said third means and said main channel means for subtracting said cancelling signal from said main channel signal to thereby reduce interference.

2. The system of claim 1 wherein said second means comprises:
   first sampling means coupled to sample and store current and past samples of said phase correlating weight;
   means coupled to said first sampling means for combining said past and current weights to form said phase predicting weight;
   second sampling means coupled to sample and store current and past samples of said amplitude correlating weight; and
   means coupled to said second sampling means for combining said current and past weights to form said amplitude predicting weight.

3. The system of claim 2 wherein each of said means for combining provides a sum of the current weight and the integral of the difference between the past and current weight as the predicting weight.

4. The system of claim 3 wherein said first and second sampling means each comprises:
   means for providing a series of pulses separated in time by a given time period;
   delay means coupled to receive said pulses and provide an output of each pulse delayed by a fixed time;
   a first sample and hold circuit coupled to said first means and said delay means for sampling a correlating weight during a delayed pulse and holding the sampled output until the next succeeding delayed pulse; and
   a second sample and hold circuit coupled to said first sample and hold circuit and said means for providing pulses for sampling the output of said first sample and hold during a pulse and holding the output: until the next succeeding pulse.

5. The system of claim 4 wherein each of said means for combining comprises:
   a subtractor coupled to receive the outputs of said first and second sample and hold circuits and provide a difference output;
   an integrator coupled to receive the difference output and provide a time integrated output over said given period; and
   an adder coupled to receive the output of said integrator and said first sample and hold circuit and provide a summed output representing a predicting weight.

6. The system of claim 5 wherein said integrator is constructed to include a reset coupled to said delay means for setting the integrator output to zero during the presence of a delayed pulse.

7. The system of claim 6 wherein said main channel means includes a directional radar antenna for receiving radar returns as said desired signals along with said interference signal, and said auxiliary channel means includes an omnidirectional antenna for receiving said primarily interference signals, and further wherein said means for providing pulses provides a radar pretrigger pulse a predetermined time before each radar pulse transmission.

8. The system of claim 2 wherein said first and second sampling means each comprises:
   means for providing a series of pulses separated in time by a given time period;
   first delay means coupled to receive said pulse, and provide an output of each pulse delayed by a first time period;
   second delay means coupled to receive said first delayed pulse and provide an output of each first delayed pulse further delayed by a second time period;
   a first sample and hold circuit coupled to said first means and said second delay means for sampling a correlating weight during a second delayed pulse and holding the sampled output until the next succeeding second delayed pulse;
   a second sample and hold circuit coupled to said first sample and hold circuit and said first delay means for sampling the output of said first sample and hold circuit during a first delayed pulse and holding the output until the next succeeding first delayed pulse, and
   a third sample and hold circuit coupled to said second sample and hold circuit and said means for providing pulses for sampling the output of said second sample and hold circuit during a pulse and holding said output until the next succeeding pulse.

9. The system of claim 8 wherein each of said means for combining comprises:
   a first subtractor coupled to receive the output of said first and second sample and hold circuits and provide a first difference output;
   a second subtractor coupled to receive the output of said second and third sample and hold circuits and provide a second difference output;
   a third subtractor coupled to receive the output of said first and second subtractors and provide a third difference output;
   a first integrator coupled to receive the first difference output and provide a time integrated output over said given period;

a second integrator coupled to receive said third difference output and provide a time integrated output over said given period; and an adder coupled to receive the output of said first sample and hold and the output of said first and second integrators and provide a summed output representing said predicting weight.

10. The system of claim 9 wherein each integrator is constructed to include a reset coupled to said second delay means for setting the integrator outputs to zero during the presence of a second delayed pulse.

11. The system of claim 10 wherein said main channel means includes a directional radar antenna for receiving radar returns as said desired signals along with said interference signals, and said auxiliary channel includes an omnidirectional antenna for receiving said primarily interference signals, and further wherein said means for providing pulses provides a radar pretrigger pulse a predetermined time before each radar pulse transmission.

* * * * *